United States Patent
Doyle et al.

(10) Patent No.: US 9,321,877 B2
(45) Date of Patent: Apr. 26, 2016

(54) PLASTICIZER FREE CURING COMPOSITION

(71) Applicant: Chemtura Corporation, Middlebury, CT (US)

(72) Inventors: Thomas R. Doyle, Wallingford, CT (US); Yujie Ding, Mount Pleasant, MI (US); Kevin Jackson, Woodbury, CT (US); Ronald O. Rosenberg, Orange, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 14/475,877

(22) Filed: Sep. 3, 2014

(65) Prior Publication Data

US 2015/0087797 A1     Mar. 26, 2015

Related U.S. Application Data

(60) Provisional application No. 61/881,615, filed on Sep. 24, 2013.

(51) Int. Cl.
| | |
|---|---|
| *C08G 18/00* | (2006.01) |
| *C08G 18/42* | (2006.01) |
| *C08G 18/22* | (2006.01) |
| *C08G 18/10* | (2006.01) |
| *C08G 18/76* | (2006.01) |

(52) U.S. Cl.
CPC ............ *C08G 18/4277* (2013.01); *C08G 18/10* (2013.01); *C08G 18/225* (2013.01); *C08G 18/7671* (2013.01)

(58) Field of Classification Search
CPC ............ C08G 18/225; C08G 18/7671; C08G 18/4277; C08G 18/10; C08G 18/3243; C08G 18/3268; C08G 18/7664; C08G 528/64
USPC ........................................ 528/64; 252/182.14
See application file for complete search history.

(56) References Cited

U.S. PATENT DOCUMENTS

| | | | | |
|---|---|---|---|---|
| 3,755,261 | A * | 8/1973 | VanGulick | 528/60 |
| 3,876,604 | A | 4/1975 | Caruso et al. | |
| 3,888,831 | A * | 6/1975 | Kogon | C08G 18/10 252/182.14 |
| 3,899,438 | A * | 8/1975 | Kalil | 252/182.15 |
| 3,900,447 | A * | 8/1975 | van Gulick | 525/440.06 |
| 4,071,492 | A * | 1/1978 | Bethea et al. | 524/775 |
| 4,075,150 | A * | 2/1978 | Hoeschele | 524/871 |
| 4,282,344 | A * | 8/1981 | Caruso | 528/51 |
| 4,521,545 | A * | 6/1985 | Kerimis et al. | 521/107 |
| 8,217,133 | B2 * | 7/2012 | Nagaraj et al. | 528/64 |
| 8,586,682 | B2 | 11/2013 | Doyle et al. | |
| 2010/0256311 | A1 * | 10/2010 | Doyle | C08G 18/10 525/453 |

* cited by examiner

*Primary Examiner* — Michael L Leonard

(74) *Attorney, Agent, or Firm* — Dilworth IP LLC

(57) ABSTRACT

Plasticizer free curing compositions comprising small particle size complexes of methylenedianiline and an alkali salt, e.g. a 3:1 coordination complex of MDA/alkali salt, with average diameter 60 micron or less, often 20 micron or less, e.g., 10 microns or less, dispersed in a volatile, non-polar, organic solvent are prepared. Stable one pack urethane compositions comprising the plasticizer free curing compositions and polyurethane prepolymers are prepared, which exhibit excellent storage stability and overcome many of the drawbacks encountered when using MDA complexes dispersed in plasticizers such as high boiling aromatic and alkyl di-esters.

13 Claims, No Drawings

PLASTICIZER FREE CURING COMPOSITION

This application claims benefit under 35 USC 119(e) of U.S. Provisional Application No. 61/881,615 filed Sep. 24, 2013, the disclosure of which is incorporated herein by reference.

The invention provides a curing composition comprising small particles of a methylenedianiline/alkali metal salt coordination complex, a non-polar organic solvent with a bp of 160° C. or less, and less than 1 wt % of a plasticizer; a method for preparing the curing composition; and a polyurethane composition comprising an isocyanate terminated prepolymer and the small particle methylenedianiline/alkali metal salt coordination complex of the curing composition.

BACKGROUND OF THE INVENTION

It has long been known that certain complexes of aromatic di-amines, for example, alkali metal salt complexes of 4,4'-methylenedianiline (MDA), can be used to cure amine-curable polymers or prepolymers without premature reaction between the curable polymer or prepolymer and the aforementioned diamines. These amine complex curatives have found use in so called one-pack polyurethanes, i.e., urethane compositions containing isocyanate terminated prepolymers, formed by reacting a polyol and poly-isocyanate, and curative which are designed to not react until activated, typically by heating.

Commercially available curing compositions comprising coordination complexes of aromatic diamines and metal salts are formulated as dispersions in high boiling liquids, typically liquids widely known as plasticizers, such as phthalate diesters.

U.S. Pat. No. 3,876,604 discloses a dispersion of a coordination complex of MDA and an alkali metal salt in an inert liquid vehicle. The MDA complex is formed by reacting an aqueous solution or brine containing a sodium or lithium chloride, bromide, iodide or nitrite salt with a methanolic solution of MDA. The MDA coordination complex has a 3:1 mole ratio of MDA to alkali metal salt and is isolated as a crystalline precipitate e.g., by filtration, decantation, centrifuging or other suitable operation, with a particle size of ≥150 microns.

In order to be effective as a curing agent, e.g., a curing agent for a polyurethane prepolymer, the particle size of the complex needs to be less than 60 microns. The particle size of the MDA complex produced by the process of U.S. Pat. No. 3,876,604 is too large to be effective, i.e., ≥150, and so a grinding or milling step is required to produce effective material.

It was found however that relatively intensive mixing is required to adequately disperse the finely divided curing agent when added alone to a polymer or prepolymer, e.g., a polyurethane prepolymer. This is not just inconvenient but may result in some premature curing because of the heat generated from the mixing operation. A major advantage of using a dispersion of the MDA complex in an inert liquid vehicle is that the curing agent can be uniformly dispersed throughout the prepolymer or polymer without expending excess energy or generating the heat that would cause premature cure.

The inert liquid vehicle must be inert to both the complex and polymer or prepolymer being cured, be readily miscible with the prepolymer or polymer which is to be cured so that the liquid and polymer may be readily comingled, and in general must possess sufficiently low volatility so as not to vaporize from the cured polymer after curing or during end-use applications. One exception to the low volatility requirement is in applications where the loss of a solvent-like material could take place without difficulty such as in surface coatings and if the liquid vehicle is sufficiently low boiling, such as methylene chloride, it can serve as an expanding agent during the curing operation to yield cellular products.

The importance of the mutual compatibility of the liquid phase of the curing agent dispersion and the polymer or prepolymer being cured is illustrated by the following example. Nujol oil, a saturated light hydrocarbon petroleum oil, readily forms a stable dispersion with the complex; however, the resultant mixture is incompatible with polyether polyurethanes, among other polymers and prepolymers, and thus Nujol dispersions are considered ineffective for curing such prepolymers.

Examples of suitable liquid carriers found in the art include esters of phthalic acid, isophthalic acid, trimellitic acid aliphatic diacids such as adipic, azeleic and sebacic acids, aromatic and naphthenic hydrocarbon processing oils, halogenated biphenyls and liquid aromatic sulfonamides. Specific examples include di(2-ethylhexyl)phthalate, tetraethylene glycol bis(2-ethylhexanoate), and an aromatic process oil comprising 18% polar compounds, 76% aromatics and 6% saturated petroleum derivatives. Paraffinic hydrocarbon oils have limited compatibility with most of the well-known amine-curable polymers and therefore are considered to be of value only on rare occasion.

U.S. Pat. No. 3,899,438 discloses that a dispersion of small particles of a MDA/alkali metal salt coordination complex can be formed in a suitable inert liquid carrier in a one step process, i.e., without a separate milling step, by running the reaction in a high shear mixer, such as a ball mill or high speed disperser run at 7,000 rpm. Suitable inert carrier liquids include di(2-ethylhexyl)phthalate and tetraethylene glycol bis(2-ethylhexanoate). U.S. Pat. Nos. 4,282,344 and 4,075,150 disclose a process similar to that of U.S. Pat. No. 3,899,438 wherein excess MDA is removed by reaction with added isocyanate (U.S. Pat. No. 4,282,344) or an aromatic mono-carbodiimide (U.S. Pat. No. 4,075,150). A similar process is also disclosed in U.S. application Ser. No. 12/754,944, now U.S. Pat. No. 8,586,682.

Commercially available curing compositions comprising coordination complexes of aromatic diamines and metal salts are formulated as dispersions in high boiling liquids, typically liquids widely known as plasticizers, i.e., aromatic diesters such as dioctyl phthalate, and alkyl diesters such as dioctyl adipate. When the curing composition is added to a prepolymer and the mixture is heated and cured, the plasticizer remains in the product. Plasticizers have negative effects on polyurethane polymers such as reduced dynamic and mechanical properties and environmental, health and safety issues due to the partial volatilization of plasticizer (smoke formation) during cure have been encountered. There is therefore a need for a readily prepared and highly effective curative composition for amine curable polymers that avoids the use of the current plasticizer carrier liquids and the problems caused by them.

SUMMARY OF THE INVENTION

Curing compositions comprising a small particle size MDA/alkali salt coordination complex, i.e., average diameter 60 micron or less, often 20 micron or less, e.g., 10 microns or less, dispersed in a volatile, non-polar, organic solvent, which are essentially free of ester based plasticizers and high boiling hydrocarbon carriers, are provided. The curing compositions of the invention are surprisingly highly effective in preparing storage stable one pack urethane compositions, overcome many of the drawbacks of the present commercially available dispersions of MDA complexes in high boiling aromatic and alkyl di-esters, and are readily prepared in good yield and high purity.

DESCRIPTION OF THE INVENTION

Provided is a curing composition, in particular a composition for curing amine curable polymers such as polyurethanes made from isocyanate terminated prepolymers, epoxy resins and the like, comprising:
  an inert liquid carrier having a polarity index of less than about 3.7 and a boiling point at atmospheric pressure of 160° C. or less; and
  a 3:1 coordination complex of 4,4'-methylenedianiline and an alkali metal salt formed as solid particles having an average diameter of from 0.1 to 50 μm, wherein the curing composition comprises less than 1 wt %, for example less than 0.1 wt % or less than 0.01 wt %, of a plasticizer selected from the group consisting of esters of polycarboxylic acids and monohydric alcohols or phenols, esters of polyols and monocarboxylic acids, triesters of phosphoric acid, aromatic hydrocarbons with a boiling point of over 200° C. and aliphatic hydrocarbons with a boiling point of over 200° C.

The relative concentrations of the inert carrier and coordination complex in the composition may vary, for example in one broad embodiment the curing composition comprises
  from 10 to 90 wt % of the coordination complex and
  from 10 to 90 wt % of the inert liquid carrier
  based on the total weight of the combination of coordination complex and carrier:
for example,
  from 20 to 80 wt %, e.g. 30 to 70 wt %, or 40 to 60 wt % of the coordination complex and
  from 20 to 80 wt % e.g. 30 to 70 wt %, or 40 to 60 wt % of the inert liquid carrier based on the total weight of the combination of coordination complex and carrier.

The curing composition will often comprise other optional components, such as surfactants, additives, reaction byproducts etc., in addition to the MDA coordination complex and inert liquid carrier. For example, in some embodiments the composition comprises:
  from 10 to 90 wt % of the coordination complex,
  from 10 to 90 wt % of the inert liquid carrier and
  from 0 to 20 wt % other components,
  based on the total weight of the curing composition:
for example:
  from 30 to 70 wt % of the coordination complex,
  from 10 to 70 wt % of the inert liquid carrier and
  from 0 to 20 wt %, e.g., from 0 to 10 wt %, or from 0 to 5 wt % other components, based on the total weight of the curing composition.

In many embodiments the composition will comprise at least 0.1 wt %, 0.5 wt %, 1 wt %, or 2 wt %, but less than 20 wt %, 15 wt %, 10 wt %, or 7 wt % of components such as surfactants, additives, reaction byproducts etc. The components other than coordination complex and carrier will be discussed in more detail later in this disclosure.

For example, in some embodiments the composition comprises:
  from 20 to 80 wt % of the coordination complex,
  from 19 to 79 wt % of the inert liquid carrier and
  from 1 to 20 wt % other components based on the total weight of the curing composition:
for example:
  from 30 to 70 wt % of the coordination complex,
  from 29 to 69 wt % of the inert liquid carrier and
  from 1 to 20 wt %, e.g., from 1 to 10 wt %, or from 1 to 5 wt % of other components based on the total weight of the curing composition.

The curing composition comprises a coordination complex of 4,4'-MDA and a salt, also referred to herein as a "4,4'-MDA complex" or "MDA complex". The alkali metal salt of the complex is typically a compound MX wherein M is typically Li, Na or K and X is an anion. Typically X is a halide anion such as Cl, Br or I, most often Cl or Br. The stoichiometry of the coordination complex is known in the art to be 3:1 ratio of MDA to alkali metal salt.

The 4,4'-MDA complex may be present in the curing composition in an amount ranging from 10 wt % to 90 wt % based on the total weight of the curing composition, typically the 4,4'-MDA complex is at least 15 wt %, 20 wt % or 25 wt % of the curing composition. Generally the composition comprises from 30 to 70 wt % or from 40 to 65 wt % of the coordination complex.

The MDA complex is produced as particles having an average diameter of from 1 to 50 μm, often 20 micron or less, e.g., from 5 to 35 μm or from 10 to 15 μm. Generally 90% by weight or more of all coordination complex particles in the curing composition have a diameter of 50 microns or less. In some embodiments, at least 90% of the particles have an diameter of less than 45 μm, e.g., less than 30 μm, and often 20 microns or less. In particular embodiments at least 95% less than 10 microns in diameter, e.g., 95% having a maximum diameter of 5 microns and or about 99% having a maximum diameter of 5 microns. The average particle sizes of MDA complex particles can be determined, for example, by means of a photomicrograph in a known manner.

The inert liquid carrier of the invention is an organic solvent having a polarity index of less than about 3.7 and a boiling point at atmospheric pressure of 160° C. or less.

It has quite surprisingly been found that non-polar solvents such as alkanes, cylclo-alkanes, and alkyl substituted benzenes, not only serve as a medium in which the MDA complex having a small particle size is prepared, but are also very effective in aiding the dispersion of MDA complex particles throughout curable substrates, for example, polyurethane prepolymers. This is in contrast to the teachings of the art wherein similar non-polar carriers such as nujol are taught to be incompatible with, e.g., polyether polyurethanes, and their use in curing compositions for such polymers is said to be ineffective. For example, carriers with a polarity index of from 0 to about 3.5 or from 0 to about 3.1 have been found to be effective. Often the carrier of the invention will have a polarity index of from 0 to about 3.0, such as from 0 to 2.7, and carriers with a polarity index of 2.5 or less, such as toluene, and carriers with a polarity index of less than 2.0, less than 1.5 such as methyl cyclohexane, less than 1.0 and even less than 0.5, such as cyclohexane, have provided excellent results.

One advantage in using volatile solvents as carriers in the present curing compositions is that once the curing composition is added and dispersed in the polymer or prepolymer to be cured it can be removed by distillation, typically at low pressure, before cure and without initiating premature curing. In many embodiments the carrier has a bp at atmospheric pressure of less than 150° C. For example, the carrier has a bp from about 40° C. to about 145° C., from 45° C. to about 140° C., or from about 50° C. to about 140° C. In one particular embodiment the carrier has a bp from about 60° C. to about 120° C.

For example, the inert liquid carrier is selected from the group consisting of
- $C_{5-9}$ straight or branched alkyl or alkene;
- $C_{2-6}$ straight or branched alkyl or alkene substituted by one or more halogen;
- $C_{4-8}$ straight or branched alkyl interrupted by oxygen;
- $C_{5-8}$ cycloalkyl or cycloalkene;
- $C_{5-8}$ cycloalkyl or cycloalkene substituted by one or more $C_{1-3}$ straight chain alkyl, $C_3$ branched alkyl, F, Cl, or Br; and
- benzene, and benzene substituted by one or more $C_{1-3}$ straight chain alkyl, $C_3$ branched alkyl, F, Cl or Br.

In some embodiments the inert liquid carrier is selected from the group consisting of
- $C_{6-8}$ straight or branched alky;
- $C_{5-7}$ cycloalkyl;
- $C_{5-7}$ cycloalkyl substituted by one or more methyl or ethyl group; and
- benzene, toluene, o-xylene, m-xylene, p-xylene, and ethyl benzene.

In some embodiments the carrier is selected from hexane, heptane, octane, branched isomers of hexane, heptane and octane, cyclohexane, methyl cyclohexane, toluene and ethyl benzene, for example, hexane, iso-octane, cyclohexane and methyl cyclohexane.

The carrier can also be a mixture of one or more organic solvents, including for example, as found in commercial petroleum ethers and xylenes etc.

The curing composition may contain a combined total of 0 to 25 wt %, typically 0 to 20 wt % or less, of various components such as surfactants, unreacted MDA isomers or metal salts, reaction by-products produced during preparation of the curing composition, e.g., reaction product of an isocyanate and an MDA isomer, and common additives, such as, for example, pigments, fillers, stabilizers, anti-settling agents, and pore-forming agents and the like. It is highly unlikely that any one of these optional components is present in an amount of 10 wt or more or even 5 wt % or more. In general, the curing composition will contain from 0.1 to 20 wt % of a combination of components other than the MDA complex and inert carrier, e.g., from 0.1 to 15 wt %, or from 0.1 to 10 wt % such as 0.1 to 5 wt %. In certain embodiments the curing composition contains from 0.5 to 15 wt %, 0.5 to 10 wt %. Often, 1% or more by weight, or 2% or more, but less than 20% or 10% by weight of the composition will be other than the MDA complex and inert carrier.

Typically, the curing composition comprises one or more surfactants, for example, in an amount of from 0.1 to 10 wt %, e.g., from 0.5 to 5.0 wt %, based on the total weight of the curing composition. Suitable surfactants include, but are not limited to anionic, cationic, and nonionic surfactants, such as oil-soluble surfactants, lecithin, and quaternary ammonium compounds. The curing composition may further comprise one or more additional additives, such as, for example, pigments, fillers, solvents, stabilizers, anti-settling agents, and pore-forming agents.

The curing composition of the invention may contain up to 20% of free, unreacted MDA, for example, up to 10% or from 0.01 to 5 wt % of free, unreacted MDA, typically as a mixture of MDA isomers. In some instance the amount of free MDA will be in the range of 1 to 5 wt % or 1 to 3.5 wt %; in other instances the amount of free MDA will be in the range of 0.01 to 1 wt %. In certain particular embodiments the amount of free MDA in the curing composition is less than 1000 wppm, e.g., less than 800 wppm or less than 500 wppm. In terms of ranges the amount of free MDA is from 0 wppm to 1000 wppm, e.g., 50 wppm to 950 wppm, 100 wppm to 800 wppm, or from 50 to 500 wppm.

The curing composition of the invention is conveniently prepared in a manner analogous to processes of the art, wherein, of course, some provision is made for the differences introduced to the process by the use of the relatively non-polar and volatile carriers of the invention.

For example, in one general embodiment the curing composition is prepared by adding 4,4'-methylenedianiline, to a mixture comprising an alkali metal salt, one or more inert liquid carrier of the present invention, one or more surfactant, and brine or water to form the coordination complex, and removing water, typically by distillation, from the mixture comprising the coordination complex.

The reaction between the MDA and the alkali salt, e.g. sodium chloride, sodium bromide etc., proceeds readily at ambient conditions. If desired one may use elevated temperatures, however, temperatures below 80° C. are recommended. The reaction requires agitation sufficient to keep changing the interface between the salt-water solution and MDA-carrier solution.

The ratio of MDA to alkali salt in the product is 3:1 but one may choose to use an excess of either component in the reaction. Typically, there is at least 0.5 part of water for every 100 parts of alkali salt and in most instance the amount of water present is insufficient to dissolve all the salt until the complex-forming reaction is at least 50% complete. In general, the relative amounts of the components in the reaction can be found in the art, e.g., U.S. Pat. Nos. 3,899,438; 3,876,604; 4,075,150; and U.S. application Ser. No. 12/754,944, now U.S. Pat. No. 8,586,682, the disclosures of which are incorporated herein by reference.

Because the inert carrier of the instant invention may have a by similar to that of water it is typically advised to remove the water in a manner that allows for the organic distillate to be separated from the aqueous distillate and returned to the reaction mixture, e.g. dean stark trap may be used. It is generally wise to use a solvent that will form an azeotrope with the water being removed, e.g., when using a solvent that boils at temperatures below 100° C. at atmospheric pressure. The temperature during distillation should be kept below the temperature at which the MDA complex disassociates, and therefore some level of vacuum is typically required.

Most sources of 4,4'-methylenedianiline also contain 2,4- and 2,2-MDA isomers which typically do not form the desired complex. In certain embodiments, processing steps to remove unreacted 4,4'-MDA, along with the less the desirable MDA isomers, are employed. For example, the curing composition may be prepared by;

A) adding 4,4'-methylenedianiline to a mixture comprising an alkali metal salt, one or more inert liquid carrier of the present invention, one or more surfactant, and brine or water to form the coordination complex, B) removing water from the mixture comprising the coordination complex to form a dry stage intermediate, C) adding an isocyanate compound to the dry stage intermediate to react with residual methylenedianiline.

Optionally, additional inert carrier and/or surfactant may be added along with the isocyanate compound in step C). Additional carrier and/or surfactant may be also optionally be added in one or more steps subsequent to addition of the isocyanate compound in step C). In some embodiments no additional carrier and/or surfactant is added after step C).

The amount of MDA and carrier used will depend on the desired concentration of MDA complex in the product composition. The alkali metal salt is generally selected from the group consisting of sodium chloride, sodium bromide, sodium iodide, potassium chloride, potassium bromide, potassium iodide, lithium chloride, lithium bromide and lithium iodide, typically sodium chloride, sodium bromide, potassium chloride, potassium bromide, lithium chloride and lithium bromide, for example sodium chloride, sodium bromide, potassium chloride and potassium bromide. In many embodiments the surfactant is selected from the group of lecithin and polyoxypropylated quaternary ammonium halides, although other surfactants may be used. Generally the total amount of surfactant employed is from about 0.5% to about 10% by weight based on the total weight of the reaction components, typically, the surfactant ranges from 1 to 5 wt % or 2 to 5 wt %.

When an isocyanate compound is added to the dry stage intermediate it can be conveniently selected from the group consisting of phenyl isocyanate, p-tolyl isocyanate, cyclohexyl isocyanate, butyl isocyanate, tolylene-2,4-diisocyanate, mixtures of tolylene-2,4-diisocyanate with tolylene-2,6-diisocyanate, 4,4'-methylenebis(phenyl isocyanate), 2,4,4'-triisocyanato-diphenyl ether, phenylene-1,4-diisocyanate, 4,4'-methylenebis(cyclohexyl isocyanate), para-phenylene diisocyanate, 1,6-hexane diisocyanate, isophorone diisocyanate, 3,3'-bitoluene diisocyanate, 1,4-cyclohexyl diisocyanate, and naphthalene-1,5-diisocyanate.

The process of the invention directly yields the MDA complex particles of the small particle size needed for adequate curing activity, i.e., particles within the size limitations recited above, without the need for any milling, grinding or other size altering steps.

The curing composition of the invention is very effective in curing, for example, isocyanate terminated prepolymers. In general, heating the mixture of prepolymer and the curative of the invention is required to effect cure, as known in the art. In many instances, the inert carrier of the inventive curing composition will be removed, typically by distillation under reduced pressure, prior to cure.

Surprising advantages have been found when the curing compositions of the invention are used to cure polyurethane prepolymer mixtures. As stated above, the inert carrier of the invention effectively disperses the MDA complex throughout the prepolymer mixture, but is also readily removed so that it does not cause complications when the prepolymer under goes cure. In cases where very high viscosity is encountered in preparing the prepolymer mixture, it is possible to use additional carrier solvent of the inventive composition without impacting the end results because the carrier solvent of the composition is typically, and readily, removed. High temperatures which sometimes results from difficult blending processes, and the premature curing that is caused, are thus avoided.

It has also been found that physical properties of the final polyurethane resin are often enhanced when using the curing composition of the invention. For example, a curing composition was prepared by mixing methylenedianiline, sodium chloride, water, surfactant and toluene to make a wet stage intermediate. Water was removed by azeotropic distillation to make the dry stage intermediate. Isocyanate was added, either along with additional surfactant (INV A), or without additional surfactant (INV B), to react with the free MDA to yield a low viscosity curing composition of the invention with low amounts of free MDA. The curing composition was then mixed with a commercial MDI-terminated polycaprolactone prepolymer, the toluene removed by vacuum distillation and the resulting mixture was poured into hot molds and cured to give plasticizer free polyurethane elastomeric samples.

The polyurethane elastomeric samples thus prepared were compared with samples prepared from a mixture of the same prepolymer and a commercially available MDA complex curing composition comprising a phthalate ester plasticizer (~7% by weight) as inert carrier. It was found that the dynamic modulus of the plasticizer free compositions INV A and INV B is about 25% higher than the standard plasticizer containing standard composition (Std) Table 1, while maintaining a similar loss tangent, Table 2.

Enhanced physical properties were also found when curing compositions of the invention were prepared using NaBr in place of NaCl. The above procedures were repeated to prepare NaBr coupling agents, INV C was prepared using additional surfactant while reacting free MDA with an isocyanate, INV D did not use the additional surfactant.

It is interesting to note that the addition of additional surfactant during the isocyanate quenching of free MDA made almost no difference in the results for INV A vs INV B, but for INV C and INV D, the NaBr coupling agents prepared with and without additional surfactant during the isocyanate quenching of free MDA, INV C and INV D, did show some variance in elastomer properties.

TABLE 1

Modulus (E+08 dyn/cm$^2$) of INV A, B, C and D vs Std

| Temp °C. | Std | INV A | INV B | INV C | INV D |
|---|---|---|---|---|---|
| 30 | 1.70 | 2.20 | 2.16 | 1.98 | 1.88 |
| 40 | 1.74 | 2.18 | 2.15 | 1.93 | 1.87 |
| 50 | 1.75 | 2.16 | 2.14 | 1.89 | 1.90 |
| 60 | 1.77 | 2.16 | 2.15 | 1.88 | 1.92 |
| 70 | 1.79 | 2.17 | 2.17 | 1.92 | 1.98 |
| 80 | 1.82 | 2.19 | 2.19 | 1.94 | 2.04 |
| 90 | 1.86 | 2.22 | 2.22 | 1.96 | 2.12 |
| 100 | 1.88 | 2.24 | 2.24 | 1.99 | 2.12 |
| 110 | 1.90 | 2.26 | 2.26 | 2.01 | 2.16 |
| 120 | 1.90 | 2.28 | 2.28 | 2.02 | 2.18 |
| 130 | 1.90 | 2.29 | 2.29 | 2.03 | 2.20 |
| 140 | 1.90 | 2.27 | 2.28 | 2.03 | 2.22 |
| 150 | 1.88 | 2.23 | 2.24 | 2.02 | 2.22 |
| 160 | 1.85 | 2.18 | 2.19 | 1.97 | 2.21 |
| 170 | 1.76 | 2.10 | 2.11 | 1.90 | 2.17 |
| 180 | 1.57 | 1.90 | 1.93 | 1.74 | 2.08 |

TABLE 2

Tan δ of INV A, B vs Std

| Temp °C. | Std | INV A | INV B | INV C | INV D |
|---|---|---|---|---|---|
| 30 | 0.039 | 0.047 | 0.045 | 0.057 | 0.057 |
| 40 | 0.033 | 0.040 | 0.039 | 0.052 | 0.050 |
| 50 | 0.028 | 0.034 | 0.034 | 0.046 | 0.043 |
| 60 | 0.025 | 0.031 | 0.031 | 0.040 | 0.038 |
| 70 | 0.023 | 0.028 | 0.028 | 0.037 | 0.035 |
| 80 | 0.022 | 0.026 | 0.026 | 0.034 | 0.033 |
| 90 | 0.021 | 0.025 | 0.025 | 0.032 | 0.030 |
| 100 | 0.020 | 0.024 | 0.023 | 0.030 | 0.028 |
| 110 | 0.020 | 0.023 | 0.022 | 0.029 | 0.027 |
| 120 | 0.020 | 0.023 | 0.022 | 0.028 | 0.026 |
| 130 | 0.020 | 0.023 | 0.022 | 0.027 | 0.025 |
| 140 | 0.022 | 0.024 | 0.023 | 0.027 | 0.024 |
| 150 | 0.022 | 0.027 | 0.024 | 0.028 | 0.024 |
| 160 | 0.023 | 0.028 | 0.026 | 0.029 | 0.023 |
| 170 | 0.027 | 0.031 | 0.027 | 0.031 | 0023 |
| 180 | 0.036 | 0.036 | 0.034 | 0.035 | 0.024 |

Other differences in physical properties were also detected between polyurethanes prepared using NaCl based curing compositions and those using NaBr based curing compositions. For example:

Elastomers prepared from plasticizer free (MDA)$_3$NaBr complexes and, e.g., MDI-terminated polycaprolactone prepolymers, have higher Trouser tear and lower compression set when compared to elastomers prepared from the same prepolymers and either the plasticizer free (MDA)$_3$NaCl of the invention or commercially obtained (MDA)$_3$NaCl.

The tan δ data of the (MDA)$_3$NaBr elastomers prepared above indicates that the glass transition and critical temperatures are higher than that of the (MDA)$_3$NaCl elastomers.

Embodiments of the invention thus provide polyurethane compositions comprising the small particle MDA salt complex of the invention and a polyurethane prepolymer, methods for preparing the compositions and polymer resins and articles prepared therefrom.

The curing composition of the invention can be used with a wide variety of polyurethane prepolymers. The polyurethane prepolymers, for example, are obtained by reacting a polyol with a polyisocyanate monomer, e.g., a diisocyanate monomer via procedures known in the art. For example, as found in U.S. Published Patent Application No. 2003/0065124, filed Aug. 2, 2001, the entirety of which is incorporated herein by reference.

Typically, the prepolymer comprises the reaction product of a polyol and a diisocyanate monomer with excess molar amounts of the diisocyanate monomer. As such, the isocyanate groups of the diisocyanate "cap" the hydroxyl groups of the polyol resulting in an isocyanate terminated prepolymer. The polyurethane prepolymer may comprise a plurality of polyols and/or isocyanates.

Exemplary polyols include polyether, polyester, polycarbonate, polycaprolactone, and/or hydrocarbon polyols. In various embodiments, the polyol may comprise one or more "high MW" polyol, e.g., one or more of a polyether, a polyester, a polycarbonate, or a polycaprolactone diol, having a molecular weight (MW) ranging from 250 to 6000, e.g., from 400 to 3000 or from 1000 to 2500. Low MW polyols, i.e., polyols with an average molecular weight of less than 250, may also be used, including aliphatic glycols such as ethylene glycol, diethylene glycol, dipropylene glycol, neopentyl glycol, 1,3-butanediol, 1,4-butanediol, and the like.

High MW polyols include polyalkylene ether polyols having the general formula HO(RO)$_n$H, wherein R is an alkylene radical and n is an integer large enough that the polyether polyol has a number average molecular weight of at least 250. Such polyalkylene ether polyols are well-known and can be prepared by the polymerization of cyclic ethers such as alkylene oxides and glycols, dihydroxyethers, and the like, using methods known in the art.

High MW polyols also include reaction products of adipic acid, succinic acid, isophthalic acid and other difunctional or multifunctional carboxylic acids with glycols, such as ethylene glycol, 1,2-propylene glycol, 1,4-butylene glycol and diethylene glycol, tetramethylene ether glycol, and the like. Some polyester polyols also employ caprolactone and dimerized unsaturated fatty acids in their manufacture, e.g., a polyester polyol obtained by the addition polymerization of e-caprolactone in the presence of an initiator.

For example, polyols useful in the preparation of the isocyanate-terminated polyurethane prepolymer of this include polypropylene glycol (PPG); PPG diol polymer from propylene, PPG-EO diol (copolymer from propylene oxide and ethylene oxide); dihydroxypolyesters; poly(ethylene adipate) glycol (PEAG) (poly(trimethylolpropane ethylene adipate) glycol (PTEAG), poly(tetramethylene ether)glycol (PTMEG), However, many other polyols are known in the art and may be used in the invention.

As with the polyol portion of the prepolymer, a wide variety of polyisocyanate monomers may be used in the preparation of the prepolymer, i.e., the poly isocyanate monomer may be any poly isocyanate, e.g., aliphatic diisocyanates or aromatic diisocyanates. Common aliphatic diisocyanates include 1,6-hexane diisocyanate (HDI), isophorone diisocyanate (IPDI), and methylene bis(p-cyclohexyl isocyanate) (H12MDI), dibenzyl-4,4'-diisocyanate, isophorone diisocyanate (IPDI), 1,3 and 1,4-xylene diisocyanates, 1,3-cyclohexyl diisocyanate, 1,4-cyclohexyl diisocyanate (CHDI) and mixtures thereof.

Typical aromatic diisocyanates include diphenylmethane diisocyanate ("MDI"), optionally polymeric MDI, toluene diisocyanate ("TDI"), naphthalene diisocyanate (NDI), 3,3'-bitoluene diisocyanate (TODI), diphenyl 4,4'-diisocyanate ("DPDI"), tetramethylxylylene diisocyanate ("TMXDI"), and para-phenylene diisocyanate (PPDI), stilbene-4,4'-diisocyanate, benzophenone-4,4'-diisocyanate, and mixtures thereof.

In certain embodiments, the diisocyanate monomers are selected from MDI PPDI, MDI, TDI, HDI and C$_{12}$MDI, e.g., PPDI, TDI and MDI.

The prepolymer is often prepared using an excess of the polyisocyanate monomer resulting in a prepolymer mixture containing unreacted monomer, e.g., unreacted or "free" diisocyanate. Levels of 20 wt % or more free monomer may be encountered. In some embodiments, the level of free diisocyanate in the prepolymer mixture may be at a reduced level, e.g., the prepolymer mixture may be a "low free" diisocyanate prepolymer mixture, e.g., free diisocyanate levels of less than 10 wt %, less than 5 wt %, less than 3 wt %, less than 1 wt %, or less than 0.5 wt %. As an example, free diisocyanate in the prepolymer mixture may be removed by distillation as is known in the art to provide prepolymer mixtures containing from about 0.001 to about 0.5% wt % MDI, e.g., from about 0.01 to about 0.3 wt %.

One embodiment relates to a composition prepared by mixing a prepolymer with the curative composition of the invention, which composition contains all the elements of the inventive dispersion including the non-polar carrier solvent with a bp of less than 160° C. Other embodiments relate to composition prepared by mixing the curative composition with the prepolymer followed by removal of most or all of the non-polar carrier solvent with a bp of less than 160° C. to provide a low solvent prepolymer mixture.

As known in the art, the MDA complex of the curing composition may be used in storage stable one pack, i.e., 1K, polyurethane compositions, which comprise an isocyanate terminated prepolymer and the MDA complex as curative. That is the curative and the prepolymer may be combined into a single composition which can be stored without reacting, and while longer storage times may be suggested with certain specific formulations, depending on temperature, storable 1K compositions are typically stable for a day up to 6 months at temperatures of 50° C. or less, and up to a week or more, e.g., 2 weeks, one month or up to three months at temperatures of up to 70° C.

Because many 1K polyurethane compositions are stored for extended periods of time, and because at the time of the invention there was little to no information how the presence of the carrier solvents of the invention would affect the storage stability of the 1K formulations, one embodiment of the invention specifically relates to a 1K composition prepared by mixing the curative composition with the prepolymer followed by removal, typically by distillation, of most or all of the non-polar carrier solvent with a bp of less than 160° C. to provide a low solvent prepolymer mixture.

For example, one embodiment provides a polyurethane prepolymer composition comprising; an isocyanate terminated polyurethane prepolymer, a small particle 3:1 coordination complex of 4,4'-MDA and an alkali metal salt, having an average diameter of e.g., from 1 to 50 μm, often less than 20 micron etc. as above, less than 1 wt % of a plasticizer selected from the group consisting of esters of polycarboxylic acids and monohydric alcohols or phenols, esters of polyols and monocarboxylic acids, triesters of phosphoric acid, aromatic hydrocarbons with a boiling point of over 200° C. and aliphatic hydrocarbons with a boiling point of over 200° C., and less than 5 wt % of a non-polar solvent with a bp of less than 160° C.

Generally the polyurethane prepolymer composition comprises less than 0.1 wt %, or less than 0.01 wt %, of the plasticizer. Other optional components found in the inventive curing composition are generally part of the polyurethane composition In addition to the possible impact of the solvent carrier on the storage stability of the 1K formulation, there are also flammability concerns. The carrier solvents of the present invention are typically volatile with low flash points, e.g., toluene flashes at 4° C. Although the carrier solvent is distilled from the 1K polyurethane prepolymer composition, residual solvent will most likely be present. As higher temperatures are typically encountered during the curing process, e.g., 70° C. to 140° C. and sometimes higher, tests were run to determine the flash point of the 1K compositions prepared using the inventive curing compositions. For example, IK polyurethane compositions were prepared from a prepolymer and a MDA/NaCl complex with known concentrations, determined by GC, of toluene and cyclohexane and subjected to standard flash point determinations.

For the toluene samples, the flash point at 5 w % toluene was 52° C., however no flash was detected at 2% at temperatures above 140° C. and in a separate test, no flash was detected at 1% at temperatures up to 150° C.

For the cyclohexane samples, the sample containing at 2 wt % cyclohexane flashed at room temperature, with 1% cyclohexane the sample did not flash till 149° C., and 0.5% cyclohexane did not flash at temperatures up to 150° C.

In certain embodiments therefore, the polyurethane prepolymer composition generally comprises 2 wt % or less, e.g., 1 wt % less or 0.5 wt % or less, 0.1 wt % or less, of the non-polar solvent with a bp of less than 160° C. For example, a polyurethane prepolymer composition generally comprises less than 1 wt % cyclohexane, often between about 0.05 and 0.25 wt % cyclohexane.

1K prepolymer compositions were prepared from an isocyanate capped prepolymer, for example, a MDI-terminated polycaprolactone prepolymer, and curing compositions of the invention prepared using cyclohexane, toluene, methyl cyclohexane, and heptane as the inert carrier. Once cured, the 1K polyurethane compositions of the invention generally provided polyurethane resins with greater tear strength, increased hardness and lower compression set and rebound than polyurethanes prepared using the same MDA complex dispersed in a traditional plasticizer carrier. For example, a mixture comprising a MDI-terminated polycaprolactone prepolymer and a suspension of MDA/NaCl complex in cyclohexane prepared according to the invention was cured to prepare test samples and compared to test samples obtained by curing a mixture of the same prepolymer and a suspension of MDA/NaCl complex in a phthalate ester.

|  | MDA/NaCl Carrier | |
| --- | --- | --- |
|  | Cyclohexane | Phthalate |
| Shore A Hardness | 95 | 92 |
| Bashore Rebound | 58 | 60 |
| Die C Tear (lbf/in) | 584 | 562 |
| Compression Set (%) | 23.3 | 24.9 |
| Split tear (lbf/in) | 172 | 155 |
| Trouser Tear (lbf/in) | 576 | 468 |

The storage stability of the 1K formulations was also investigated. Samples were stored under nitrogen at 50° C. and 70° C. for up to four weeks and periodically screened for increases in viscosity or premature cure, and to determine whether the physical properties of cured polymer resin from aged formulations was equal to cured polymer resin from non-aged formulations.

Good results were obtained for curatives prepared in e.g., toluene, cyclohexane, methyl cyclohexane, and heptane upon storage of up to 4 weeks at 50° C. Samples were of course less stable at 70° C., however acceptable results were also frequently obtained at that temperature.

During storage of some of the samples, it was found that better storage stability could frequently be obtained by preparing a 1K formulation with additional isocyanate, either added to the prepolymer/curative mixture or present in the prepolymer as received. These effects appeared to be variable depending on the materials and processes used in the preparation of the curing composition.

The low carrier solvent 1K polyurethane composition of the invention can be conveniently prepared by mixing the curing composition of the invention with a prepolymer, often at temperatures of from 20° C. to about 100° C., typically at temperatures of 25° C. or higher and as high as 80° C. or lower, e.g., from 35° C. to about 75° C., until the curative is thoroughly dispersed, e.g., from about 0.1 to about 4 hours, and then distilling off the solvent that the curative was dispersed in, in most cases under vacuum.

The above process can be run with obvious modifications using curing compositions of the invention prepared as dispersions in other non-polar solvents with a bp of less than 160° C., e.g., methyl cyclohexane, toluene, heptane, hexane and the like.

The polyurethane resins prepared using the curing compositions of the present invention can be used in the formation of any final article known to be prepared from polyurethanes, including a variety of film, sheet and profile applications, casters, wheels, rollers, tires, belts, sporting goods, footwear, protection equipment, medical devices including surgical instruments and body parts, interior, exterior and under the hood auto parts, power tools, hosing, tubing, pipe, tape, valves, window, door and other construction articles, seals and gaskets, inflatable rafts, fibers, fabrics, wire and cable jacketing, carpet underlay, insulation, business equipment, electronic equipment, connectors electrical parts, containers, appliance housings, toys etc.

Plasticizer-free MDA complexes were successfully synthesized in organic solvents such as toluene, methyl cyclohexane, heptane and cyclohexane. Conversion rate of MDA to $(MDA)_3 \cdot NaCl$ or $(MDA)_3 \cdot NaBr$ in the present solvents are comparable or higher than in DOA as demonstrated by the low free MDA level after wet stage. 1K polyurethane compositions prepared by blending the present curing compositions with prepolymers followed by removal of the solvent showed very good stability when aged at 50° C. and acceptable stability at 70° C.

EXAMPLES

General Process for Preparing Curing Compositions

The curing compositions are prepared, unless otherwise noted, in a three step process:
1) Wet stage—Solid 4,4'-methylenedianiline is slowly added to a stirred mixture of non-polar solvent with a bp of 160° C. or less, a polypropoxy quaternary ammonium chloride surfactant, e.g., VARIQUAT CC42NS, abbreviated herein as "NS", NaCl or NaBr added as a solid, NaCl or NaBr added as brine, and water, typically at 50° C., on occasion at room temperature. The resulting mixture is stirred until no solid MDA is visible.
2) Dry stage—The wet stage intermediate is stirred at 50° C. (typically) and vacuum is gradually applied to remove water via azeotropic distillation until no additional water droplets are observed, co-distilled solvent is returned to the reaction mixture, e.g., as overflow from a Dean Stark trap.
3) Scavenge stage—Additional solvent and surfactant are added, including "NS" above and an ethoxylated octyl phenol surfactant e.g., TRITON 15x, abbreviated herein as "TS", and while stirring the resulting mixture at 50° C. an isocyanate is added drop wise, the following examples use 4,4'-methylenebis(cyclohexylisocyanate), and the resulting mixture stirred.

The following solvents were successfully employed as the inert carrier.

| Solvent | Polarity Index | Boiling Point (1 atm) |
| --- | --- | --- |
| Cyclohexane | 0.2 | 80.7° C. |
| Toluene | 2.4 | 110-111° C. |
| Methyl cyclohexane | 1.2 | 101° C. |
| Heptane | 0.1 | 98° C. |

Example 1

MDA/NaCl in Cyclohexane

Wet Stage

To a stirred mixture of 643.3 grams of cyclohexane, 18.0 grams polypropoxy quaternary ammonium chloride surfactant (i.e. NS), 77.7 grams NaCl added as a solid, an additional 20.3 grams of NaCl in brine, and 60.9 grams of water at 50° C. was slowly added 900 grams solid MDA. MDA pellets dissolved/reacted fairly quickly and the reaction mixture turned creamy white. The resulting mixture was stirred overnight until no solid MDA is visible. Wet stage MDA % was 0.163.

Dry Stage

An additional 150 mL of cyclohexane was added to the reaction mixture, which was heated at 50° C. and vacuum was gradually applied. Water was removed via azeotropic distillation until no additional water droplets were observed, co-distilled cyclohexane was returned to the reaction mixture as overflow from a Dean Stark trap. Water came out quickly during dry stage and the water and cyclohexane layers separated easily. Approximately 56 mL water was collected in the Dean-Stark apparatus, after 6-8 hrs of stripping and water content was 528 ppm; Dry stage MDA % was 0.212.

Scavenge Stage

A) To 347.60 g of the dry stage intermediate was added 43 g cyclohexane, 3.56 g NS, and 9.888 g of an ethoxylated octyl phenol surfactant (i.e., "TS"). The resulting mixture was allowed to mix well at 50° C. and 1.74 g of 4,4'-methylene bis(cyclohexylisocyanate) was added drop wise. The reaction was stirred for 3 hrs before adding 5.20 g additional NS. MDA % of the final product was 0.198.

B) To 494 g of the dry stage intermediate was added 4.9 g cyclohexane, 14 g NS, and 60 g TS. The resulting mixture was allowed to mix well at 50° C. and 5.75 g of 4,4'-methylene bis(cyclohexylisocyanate) was added drop wise. The reaction was stirred for 3 hrs before adding 5.75 g additional NS. MDA % of the final product was 0.128.

Example 2

MDA/NaCl in Cyclohexane, MDA Added in Scavenge Stage

The wet stage and dry stage procedure of example 1 was repeated. Free MDA % of the wet stage intermediate was 0255; dry stage intermediate free MDA % was 0.27.

Scavenge Stage

The general procedure of Example 1A) scavenge stage was repeated using 432 g dry stage product except that 3.76 g MDA was added along with 5 g 4,4'-methylene bis(cyclohexyl isocyanate). The final product has 0.0856% free MDA.

Products remained well dispersed, upon rolling, after storage.

Example 3

MDA/NaBr in Cyclohexane

Wet Stage

To a stirred mixture of 643.5 grams of cyclohexane, 12.1 grams NS, 73.3 grams NaBr added as a solid, and additional 40.9 grams NaBr in brine, and 50.0 grams of water at 50° C. was slowly added 600 grams solid MDA. The resulting mixture was stirred overnight until no solid MDA is visible. Wet stage MDA % was 0.074.

Dry Stage

The reaction mixture was heated at 50° C. and vacuum was gradually applied. Water was removed via azeotropic distillation, co-distilled cyclohexane was returned to the reaction mixture as overflow from a Dean Stark trap. Dry stage water content was 467 ppm; Dry stage MDA % was 0.033.

Scavenge Stage

A) To 370 g of the dry stage intermediate was added 60 g of cyclohexane, 2.61 g NS, and 7.46 g TS. The resulting mixture was allowed to mix well at 50° C. and 2.12 g of 4,4'-methylene bis(cyclohexylisocyanate) was added drop wise. The reaction was stirred for 3 hrs before adding 3.93 g additional NS. MDA % of the final product was 0.034.

B) To 250 g of the dry stage intermediate was added 60 g of cyclohexane, 1.76 g NS, and 5.04 g TS. The resulting mixture was allowed to mix well at 50° C. and 0.63 g of 4,4'-methylene bis(cyclohexylisocyanate) was added drop wise. The reaction was stirred for 3 hrs before adding 2.65 g additional NS. MDA % of the final product was 0.030.

Example 4

MDA/NaCl in Toluene

The wet stage and dry stage procedure of Example 1 was repeated using toluene in place of cyclohexane. The wet stage reaction was run overnight, wet stage MDA % 4.155. After dry stage water content was ~800 ppm and MDA % was 2.272.

Scavenger Stage

A) The scavenge stage of example 1A was repeated using a 1:1 ratio of the NCO/$NH_2$ (eq/eq). Final MDA % was 0.7545.

B) The scavenge stage of example 1A was repeated using a 2:1 ratio of the NCO/$NH_2$ (eq/eq). Final MDA % was 0.3939.

Example 5

MDA/NaCl in Toluene, Room Temperature Wet Stage

The wet stage and dry stage procedures of Example 4 was repeated except that the wet stage was carried out at room temperature and required 40 hours for completion. Free MDA level after wet stage reaction was 1.474%. Water was stripped during the dry stage for ~20 hours. water content after Dry stage was ~600 ppm; Free MDA % was 1.747%.

The scavenge stage procedure of example 4B was repeated with the dry stage intermediate to yield a final product with a free MDA % of 0.7559%.

Example 6

MDA/NaCl in Methyl Cyclohexane

The wet stage and dry stage procedure of Example 1 was repeated using methyl cyclohexane in place of cyclohexane. Wet stage reaction was run overnight. The reaction proceeded smoothly resulting in a creamy white dispersion at the end of wet stage, Wet stage MDA % was 0.302; wet stage water content was 34784 ppm. Water content after dry stage was originally ~800 ppm; after stripping an additional 4.5 hrs water content was ~560 ppm; dry stage MDA % was 0.276.

Scavenger Stage

The scavenge stage was run on portions of the dry stage intermediate according to the procedure of Experiment 1 using different amounts of isocyanate as follows: 1× represents a ratio of 1 eq:1 eq of NCO: amine content of the dry stage intermediate, 1.5× represents a 1.5:1 ratio, 2× represents a 2:1 ratio.

| | | |
|---|---|---|
| A) 1X isocyanate | | final MDA % 0.2307 |
| B) 1X isocyanate | final surfactant addition eliminated | final MDA % 0.0701 |
| C) 1.5 X isocyanate | | final MDA % 0.2031 |
| D) 1.5 X isocyanate | final 2 surfactant additions eliminated | final MDA % 0.1083 |

Example 7

MDA/NaBr in Methyl Cyclohexane

The procedure of Example 3 (NaBr instead of NaCl, reduced solids content) was repeated using methyl cyclohexane in place of cyclohexane. Water content after the wet stage 40426 ppm, 1348 ppm after overnight distillation. Free MDA level after wet stage was 0.087%, after dry stage 0.095%. Scavenge stage added 0.5 wt % isocyanate. The final product has 0.0191% free MDA. The final thin dispersion became thick and jelly-like after storing at room temperature overnight, but returned to fluid upon stirring.

Example 8

MDA/NaCl in Heptane

The procedure of Example 1 was repeated using heptane in place of cyclohexane. Reaction mixture showed the typical creamy white texture shortly after the reaction started, however, the viscosity of the mixture was higher than usual. MDA pellets disappeared after ~26 hours. Wet stage 0.105% free MDA. Dry stage reaction was not performed due to high viscosity.

Example 9

MDA/NaCl in Heptane, Reduced Solids

The procedure of Example 9 was repeated a lower solid content to decrease viscosity. MDA pellets were still visible after 24 hrs. MDA pellets disappeared after ~48 hours. Wet stage free was 0.115%. Only 2-3 mL water was collected in Dean-Stark despite of steady reflux during dry stage reaction, however, water content in the product decreased to ~500 ppm. Scavenge reaction run according to Example 1A was carried out successfully using 0.5 wt % isocyanate.

General Process for Preparing 1K Polyurethane Compositions:

The 1K polyurethane compositions are prepared in the following manner. Molten prepolymer is optionally degassed and maintained at 50° C. with agitation. The curing composition of the invention (95% stoi) as a dispersion in the selected solvent is added to the reactor slowly, given some time for the curative to be dispersed into the prepolymer. Optionally, additional isocyanate (MDI) is added. After an additional 10 min to 3 hours of mixing, the pressure is gradually reduced using a vacuum pump and held at a desired level to remove the dispersion solvent so that less than 2% solvent remains.

In the following Examples, commercially available MDI-terminated polycaprolactone prepolymers were used to prepare the following 1K polyurethane compositions:

Prepolymer A is a MDI-terminated polycaprolactone prepolymer containing <1% free MDI Prepolymer B is a MDI-terminated polycaprolactone prepolymer containing 2.4-3.0% free MDI.

Compositions were cured 140° C. and post cured at 140° C. for 24 hours.

Stability of Cyclohexane-Based 1K

Samples the 1K compositions were stored in 8 oz glass jars with nitrogen blanket and then placed in dry cans. Samples were aged at 50° C. and/or 70° C. The change in viscosity was measured, reported in cP, at 50° C. and/or 70° C. with spindle 27 at 10 rpm unless otherwise noted. T0 represents the sample before aging.

IK Polyurethane Compositions from Curative Compositions in Cyclohexane

According to the general procedure above, prepolymer B was mixed with the curative of Example 1A, 2, and 3A to produce the 1K compositions containing less from about 0.05 to about 0.5 wt % cyclohexane after vacuum distillation. Samples were aged at 50° C. and 70° C. and viscosity measurements were taken at 50° C. and 70° C. as described above.

| IK Composition | Prepolymer | Free MDI | Curative |
|---|---|---|---|
| Example 10 | B | 2.4-3.0% | Ex 1A, MDA/NaCl |
| Example 11 | B | 2.4-3.0% | EX 2, MDA/NaCl MDA added |
| Example 12 | B | 2.4-3.0% | Ex 3A, MDA/NaBr |

Viscosity (cSt) of IK Polyurthene Composition Upon Aging

| EX 10 | Aged@50° C. | | Aged@70° C. | |
|---|---|---|---|---|
| | vis@50 C. | vis@70 C. | vis@50 C. | vis@70 C. |
| T0 | 8275-8325 | 3075 | — | — |
| 1 d | 8725-8775 | 3225-3275 | 14575-14900 | 5425-5550 |
| 3 d | 9100-9175 | 3300-3325 | 15525-15775 | 5625-5725 |
| 7 d | 9450-9700 | 3425-3500 | 16850-16925 | 6150-6200 |
| 14 d | 10100-10200 | 3550-3600 | 22100-22225 | 7700-7800 |
| 30 d | 11325-11550 | 3975-4025 | Very Thick | 14350 |

Viscosity (cSt) of IK Polyurthene Composition Upon Aging

| EX 11 | Aged@50° C. | | Aged@70° C. | |
|---|---|---|---|---|
| (MDA added) | vis@50 C. | vis@70 C. | vis@50 C. | vis@70 C. |
| T0 | 7925-7950 | 2725-2750 | — | — |
| 1 d | 8050-8100 | 2925-2950 | 9500-9625 | 3150-3200 |
| 3 d | 8525-8550 | 2875-2900 | 9900-9975 | 3325-3359 |
| 7 d | 8850-8900 | 2950 | 1150-11575 | 3825-3850 |
| 14 d | 9650-9850 | 3125 | 14600-14625 | 4800-4825 |
| 30 d | 10150 | 3400 | — | 11900 |

Viscosity (cSt) of IK Polyurthene Compositions Upon Aging

| Ex 12 | Aged@50° C. | | Aged@70° C. | |
|---|---|---|---|---|
| (MDA/NaBr) | vis@50 C. | vis@70 C. | vis@50 C. | vis@70 C. |
| T0 | 9950-9000 | 3975-4000 | — | — |
| 1 d | 8900-9000 | 3300-3325 | 9275-9500 | 3500-3575 |
| 2 d | 9100-9175 | 3325-3400 | 10325-10625 | 3725-3825 |
| 5 d | 10325-10550 | 3975-4025 | 17950-18200 | 6325-6450 |
| 7 d | 10000-10050 | 3625-3650 | 62500-64000 | 18700-19025 |
| 14 d | 11050-11225 | 4050-4100 | Cured | — |
| 30 d | 15100-15275 | 5350-5400 | Cured | — |

IK Polyurethane Compositions from Curative Compositions in Toluene

According to the general procedure above, prepolymer A was mixed with the curative of Example 5 and 4 to produce 1K compositions. Samples of the 1K compositions were cured at 140° C. and additional samples were aged at 50° C. and 70° C. as above. Data for aged samples reported for measurements at 50° C.

Ex 13 was prepared using the curative of Example 5 and contained about 0.5 wt % toluene after vacuum distillation. The cured polymer had a hardness of 88-90 A.

Ex 14 was prepared using a 7 day old sample of the curative of Example 5 diluted with additional toluene and contained about 1.3 wt % toluene after vacuum distillation. The cured polymer had a hardness of 89-90 A.

Ex15 was prepared by combining the prepolymer, the curative of Example 4, and an additional 3 wt % MDI; and contained about 0.6 wt % toluene after vacuum distillation. The cured polymer had a hardness of 92-93 A.

| IK Composition | Prepolymer | Free MDI | Curative |
|---|---|---|---|
| Example 13 | A | <1% | Ex 4 |
| Example 14 | A | <1% | Ex 5 |
| Example 15 | A | ~3% | Ex 4 |

Viscosity (cSt) @ 50° C. of IK Polyurthene Compositions Upon Aging

| | Example 13, <1% MDI | | EXAMPLE 15, 3% MDI | |
|---|---|---|---|---|
| | aged@ 50° C. | aged@70° C. | aged@ 50° C. | aged@70° C. |
| T0 | 15,175-15,300 | — | 6,675-6,825 | — |
| 2 d | 19,600-19,725 | cured | 9150-9225 | 9575-9375 |
| 7 d | 40450 | — | 9225-9325 | 13400-13700 |
| 14 d | — | — | 10600-10625 | 18325-18350 |

IK Polyurethane Compositions from Curative Compositions in Methyl Cyclohexane

According to the general procedure above, prepolymer A or B was mixed with the curative of Example 6B, 6C, 6D, and 7 (MDA/NaBr to produce the 1K compositions containing from about 0.05 to about 0.9 wt % methyl cyclohexane after vacuum distillation. Samples were aged at 50° C. and 70° C. and viscosity measurements were taken at @50° C. and 70° C. as above.

| IK composition | Prepolymer | Free MDI | Curative |
|---|---|---|---|
| Example 16 | A | <1% | Ex 6B, MDA/NaCl |
| Example 17 | B | ~2.5% | Ex 6C, MDA/NaCl |
| Example 18 | B | ~2.5% | Ex 6D, MDA/NaCl |
| Example 19 | B | ~2.9% | Ex 7, MDA/NaBr |

Viscosity (cSt) @ 50° C. of IK Polyurthene Compositions Upon Aging

| | Ex 16 - vis@ 50° C. | | Ex 18 - vis@ 50° C. | |
|---|---|---|---|---|
| | aged@ 50° C. | aged@70° C. | aged@ 50° C. | aged@70° C. |
| T0 | 10,850-10,925 | — | 7,775-7,800 | — |
| 2 d | — | — | 8,100-8,200 | solid |
| 3 d | — | 64,300-66,700 | — | — |
| 5 d | — | — | 12,400-12,500 | — |
| 7 d | 18,025-18,200 | — | — | — |

Viscosity (cSt) of IK Polyurthene Compositions Upon Aging

| Ex 17 | Aged@50° C. | | Aged@70° C. | |
|---|---|---|---|---|
| | vis@50 C. | vis@70 C. | vis@50 C. | vis@70 C. |
| T0 | 9050-9125 | 33250 | — | — |
| 3 d | 11,500-11,675 | 3,850-3,900 | 18,325-18,375 | 6,725-6-750 |

Viscosity (cSt) of IK Polyurthene Compositions Upon Aping

| Ex 19 (MDA/NaBr) | Aged@50° C. | | Aged@70° C. | |
|---|---|---|---|---|
| | vis@50 C. | vis@70 C. | vis@50 C. | vis@70 C. |
| T0 | 10050-10100 | 4075-4125 | — | — |
| 1 d | 9550-9600 | 3,800-3,850 | 9,400-9,550 | 3,550-3,600 |
| 3 d | 9975-10,000 | 3975-4,000 | 11,800-12,125 | 4,350-4,500 |
| 7 d | 10,400-10,450 | 4,075-4,100 | solid | solid |
| 14 d | 11,325-11,450 | 4,350-4,375 | — | — |
| 40 d | 23,150-23,450 | 7,825-8,000 | — | — |

The invention claimed is:

1. A curing composition comprising:
   an inert liquid carrier having a polarity index of from 0 to about 1.5 and a boiling point at atmospheric pressure of 160° C. or less selected from the group consisting of $C_{6-8}$ straight chain alkyl, $C_{6-8}$ branched alkyl, $C_{5-7}$ cycloalkyl and $C_{5-7}$ cycloalkyl substituted by one or more methyl or ethyl group; and
   from 10 to 90 wt %, based on the total weight of the curing composition of a 3:1 coordination complex of 4,4'-methylenedianiline and an alkali metal salt formed as solid particles having an average diameter of from 1 to 50 μm,
   wherein the curing composition comprises less than 1 wt % of a plasticizer selected from the group consisting of esters of polycarboxylic acids and monohydric alcohols or phenols, esters of polyols and monocarboxylic acids, triesters of phosphoric acid, aromatic hydrocarbons with a boiling point of over 200° C. and aliphatic hydrocarbons with a boiling point of over 200° C.

2. The curing composition of claim 1, wherein the alkali metal salt is selected from the group consisting of sodium chloride, sodium bromide, sodium iodide, potassium chloride, potassium bromide, potassium iodide, lithium chloride, lithium bromide and lithium iodide.

3. The curing composition of claim 2 wherein the coordination complex of 4,4'-methylene dianiline and an alkali metal salt particles have an average diameter of 20 microns or less.

4. A one pack urethane composition comprising an isocyanate terminated prepolymer and a curing composition according to claim 1.

5. A one pack urethane composition obtained by mixing an isocyanate terminated prepolymer and a curing composition according to claim 1 followed by removing 90% or more of the inert liquid carrier having a polarity index of from 0 to about 1.5 and a boiling point at atmospheric pressure of 160° C. or less.

6. A process for preparing a curing composition comprising an inert liquid carrier having a polarity index of from 0 to about 1.5 and a boiling point at atmospheric pressure of 160° C. or less selected from the group consisting of $C_{6-8}$ straight chain alkyl, $C_{6-8}$ branched alkyl, $C_{5-7}$ cycloalkyl and $C_{5-7}$ cycloalkyl substituted by one or more methyl or ethyl group; and a coordination complex of 4,4'-methylenedianiline and an alkali metal salt,
   said process comprising
   adding 4,4'-methylenedianiline to a mixture comprising
      i) an alkali metal salt selected from the group consisting of potassium chloride, potassium bromide, potassium iodide, sodium chloride, sodium bromide, sodium iodide, lithium chloride, lithium bromide, lithium iodide;
      ii) one or more inert liquid carrier having a polarity index of from 0 to about 1.5 and a boiling point at atmospheric pressure of 160° C. or less selected from the group consisting of $C_{6-8}$ straight chain alkyl, $C_{6-8}$ branched alkyl, $C_{5-7}$ cycloalkyl and $C_{5-7}$ cycloalkyl substituted by one or more methyl or ethyl group;
      iii) a surfactant: and
      iv) brine and/or water,
   wherein there is present at any point during the process less than 1.0 wt % plasticizer selected from the group consisting of esters of polycarboxylic acids and monohydric alcohols or phenols, esters of polyols and monocarboxylic acids, triesters of phosphoric acid, aromatic hydrocarbons with a boiling point of over 200° C. and aliphatic hydrocarbons with a boiling point of over 200° C., and
   wherein the coordination complex of 4,4'-methylene dianiline and an alkali metal salt obtained by the process without grinding has an average diameter of less than 50 microns.

7. The process according to claim 6 wherein the surfactant iii) comprises one or more compounds selected from the group consisting of lecithin, polyoxypropylated quaternary ammonium halides, and phosphated glycerides.

8. The process of claim 6, which also comprises a distillation process to remove water.

9. The process of 8, wherein after removal of some or all of the water, an isocyanate compound is added to react with some or all of the residual methylenedianiline.

10. The curing composition according to claim 3 obtained by a process comprising
   adding 4,4'-methylenedianiline to a mixture comprising
      i) an alkali metal salt selected from the group consisting of, potassium chloride, potassium bromide, potassium iodide, sodium chloride, sodium bromide, sodium iodide, lithium chloride, lithium bromide, lithium iodide;
      ii) an inert liquid carrier having a polarity index of from 0 to about 1.5 and a boiling point at atmospheric pressure of 160° C. or less selected from the group consisting of $C_{6-8}$ straight chain alkyl, $C_{6-8}$ branched alkyl, $C_{5-7}$ cycloalkyl and $C_{5-7}$ cycloalkyl substituted by one or more methyl or ethyl group;
      iii) a surfactant: and
      iv) brine or water,
   wherein there is present at any point during the process less than 1.0 wt % plasticizer selected from the group consisting of esters of polycarboxylic acids and monohydric alcohols or phenols, esters of polyols and monocarboxylic acids, triesters of phosphoric acid, aromatic hydrocarbons with a boiling point of over 200° C. and aliphatic hydrocarbons with a boiling point of over 200° C., and
   wherein the coordination complex of 4,4'-methylene dianiline and an alkali metal salt obtained by the process without grinding has an average diameter of 20 microns or less.

11. The curing composition according to claim 10 wherein the surfactant iii) comprises one or more compounds selected from the group consisting of lecithin, polyoxypropylated quaternary ammonium halides, and phosphated glycerides.

12. The curing composition of claim 10, wherein the process by which the curing composition is obtained also comprises a distillation process to remove water and after removal of some or all of the water, adding an isocyanate compound to react with some or all of the residual methylenedianiline.

13. The curing composition of claim 12, wherein the isocyanate compound added to react with some or all of the residual methylenedianiline intermediate is selected from the group consisting of phenyl isocyanate, p-tolyl isocyanate, cyclohexyl isocyanate, butyl isocyanate, tolylene-2,4-diisocyanate, mixtures of tolylene-2,4-diisocyanate with tolylene-2,6-diisocyanate, 4,4'-methylenebis(phenyl isocyanate), 2,4, 4'-triisocyanato-diphenyl ether, phenylene-1,4-diisocyanate, 4,4'-methylenebis(cyclohexyl isocyanate), para-phenylene diisocyanate, 1,6-hexane diisocyanate, isophorone diisocyanate, 3,3'-bitoluene diisocyanate, 1,4-cyclohexyl diisocyanate, and naphthalene-1,5-diisocyanate.

* * * * *